(No Model.)
D. F. OLIVER.
PITMAN BOX.
No. 289,779. Patented Dec. 4, 1883.
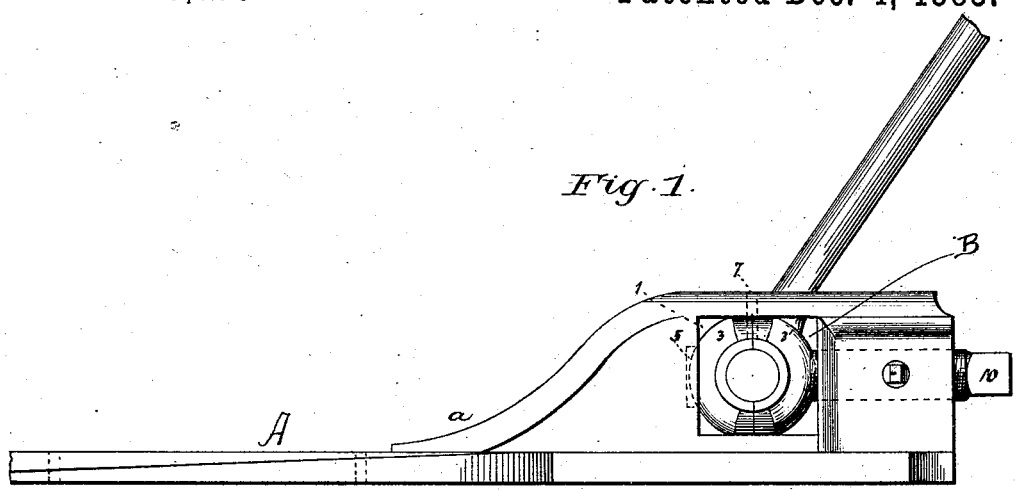
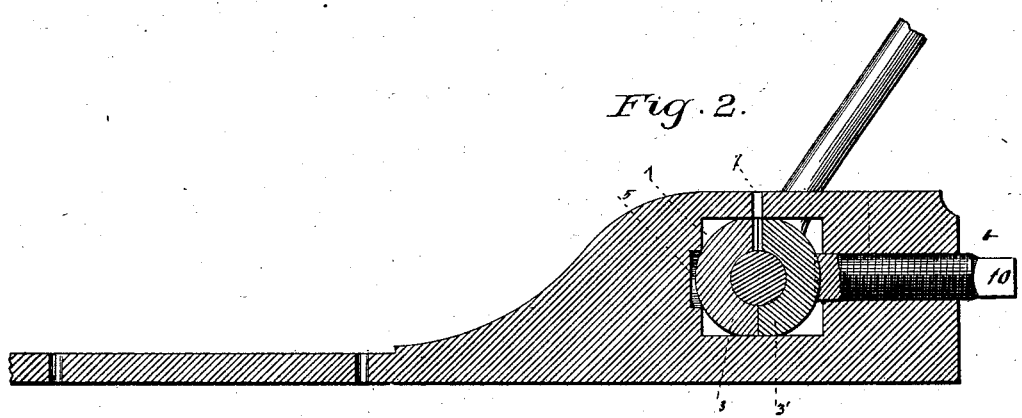
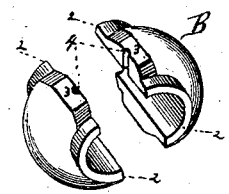
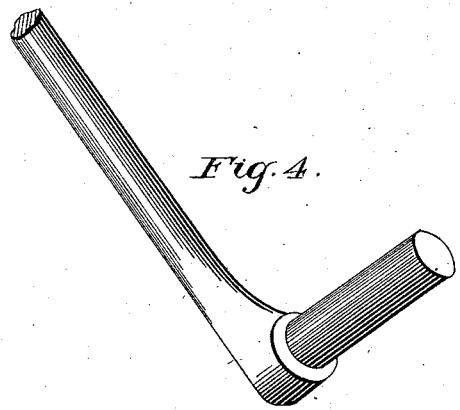
Witnesses:
Jas. J. Sheehy.
Theo. Mungen.
Inventor:
D. F. Oliver
By Anderson & Smith
his attorneys

UNITED STATES PATENT OFFICE.

D. FRANKLIN OLIVER, OF HUNTSVILLE, MISSOURI.

PITMAN-BOX.

SPECIFICATION forming part of Letters Patent No. 289,779, dated December 4, 1883.

Application filed September 24, 1883. (No model.)

*To all whom it may concern:*

Be it known that I, D. FRANKLIN OLIVER, a citizen of the United States, residing at Huntsville, in the county of Randolph and State of Missouri, have invented certain new and useful Improvements in Pitman-Boxes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention has relation to improvements in pitman-boxes; and it consists in the construction and novel arrangement of devices, as will be hereinafter more fully set forth, and particularly pointed out in the claim appended.

My invention has for its object to provide a cheap and simple means whereby the crank-pin and box may be secured to a pitman, and so constructing the box that it might be easily lubricated. This object I accomplish by the means shown and illustrated in the accompanying drawings, in which—

Figure 1 is a representation of a portion of a pitman showing my invention applied. Fig. 2 is a longitudinal central sectional view of the same. Fig. 3 is a perspective view of the box, showing the sections separated; and Fig. 4 is a perspective detail view of the crank-pin.

Heretofore pitmen have been constructed with a socketed head, having a concavity at one side and a concave-ended set-screw at the other side of the crank-pin box, the box having convexities resting in the said concavities and an annular flange at opposite ends. I am aware that it is also old to make the box in sections.

Referring to the drawings by letter, A indicates a harvester pitman-heel, which is provided with a rectangular lateral aperture, 1, and about midway above this aperture with a perforation, 7, for the introduction of oil or other lubricant to the crank-pin of the pitman through a similar perforation, 4, in the box B. In the forward wall of the aperture 1 is a recess, 5, which is about the diameter of the arc described by the periphery of the box at its point of contact, and in the rear wall a horizontal longitudinally-threaded perforation, $b$, for the screw 10, which has its inner end concave to bear upon the outer surface of the box diametrically opposite to the recess 5. This perforation $b$ may be provided with a lateral perforation and set-screw or lock-nut 6.

The box B is made in sections, as shown in Fig. 3, and each section is provided with a semicircular extending flange, 2, and opposite flattened sides, 3. The flanges are not only used to form a bearing for the pitman, but also to hold the box in position when the pitman is removed, while the flattened parts serve to keep the joints one above the other and bring the stress of the pitman on the solid parts of the box.

Having thus described my invention, what I claim as new, and desire to secure by Letters Patent, is—

The pitman-heel having the rectangular aperture 1, provided with the recess 5, and the opposite threaded perforation, $b$, occupied by the set-screw 10, in combination with the box B, made in semicircular sections provided at their ends with semicircular flanges 2 2, and between these flanges with the flattened sides 3 3, grooved to form the oil-hole, substantially as specified.

D. FRANKLIN OLIVER.

Witnesses:
GEO. W. TAYLOR,
W. F. HAMMETT.